United States Patent Office

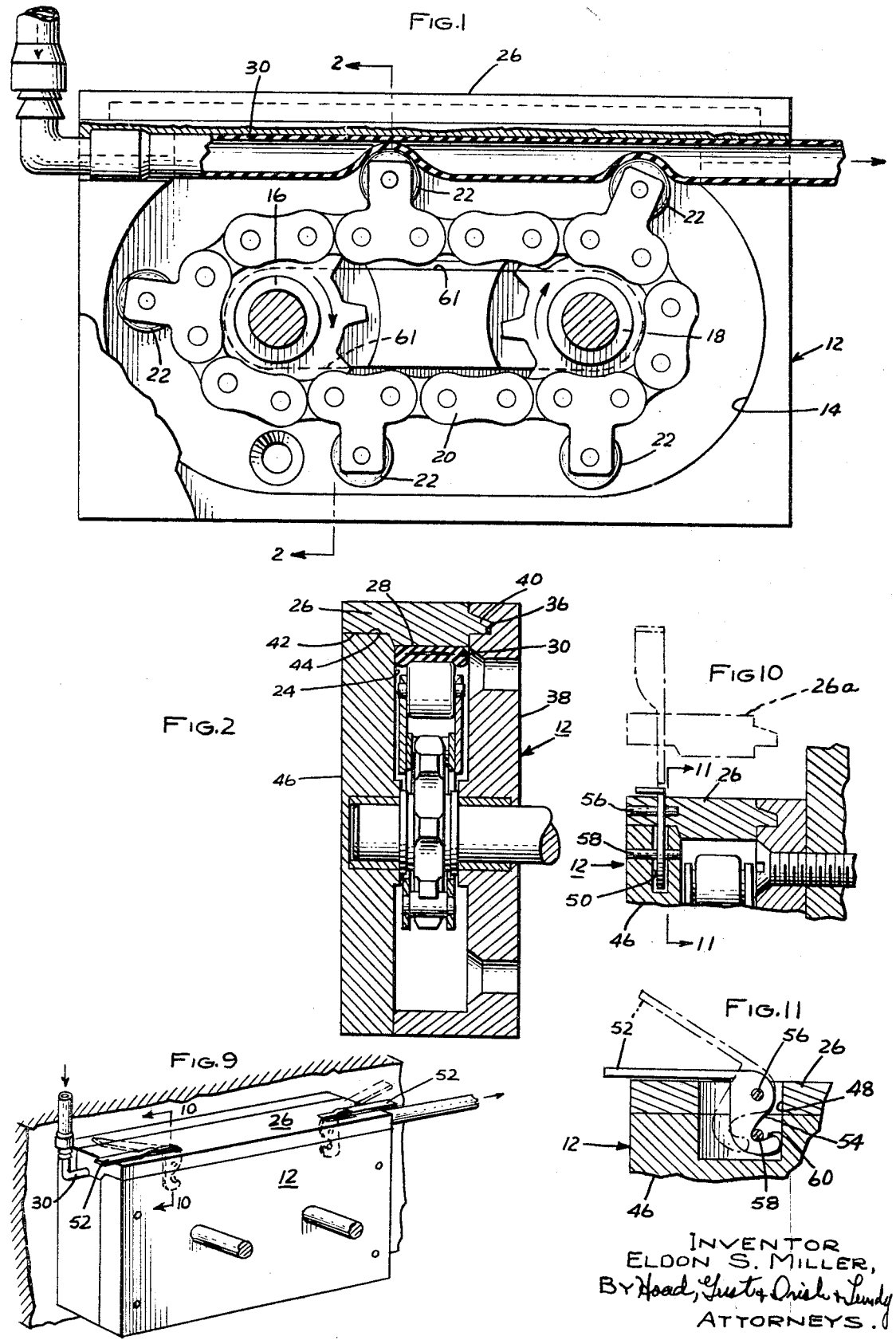

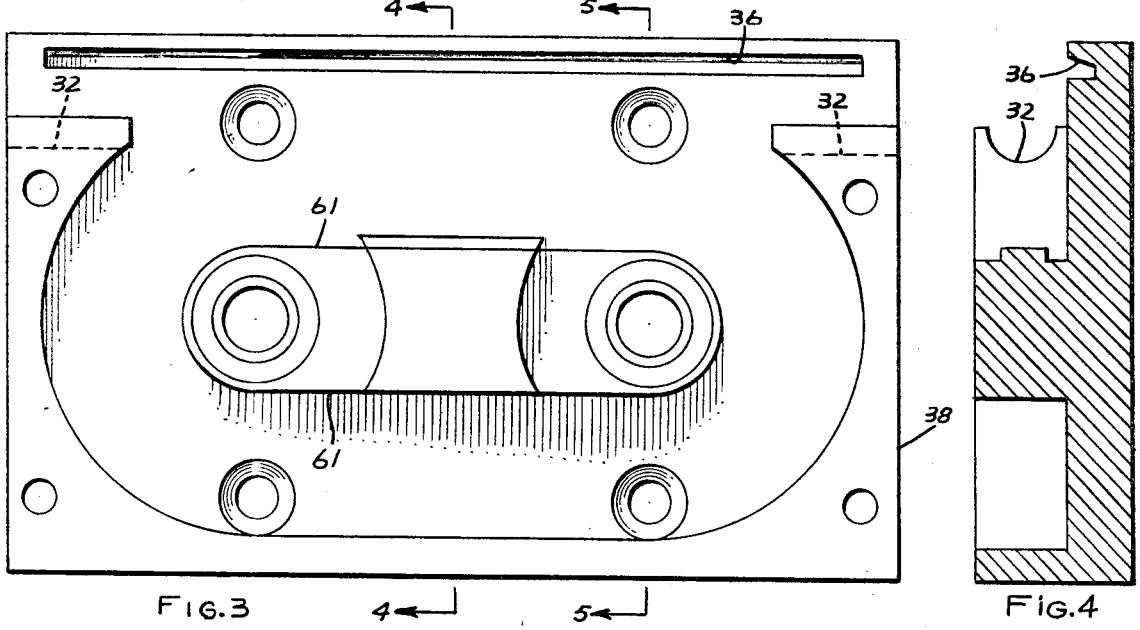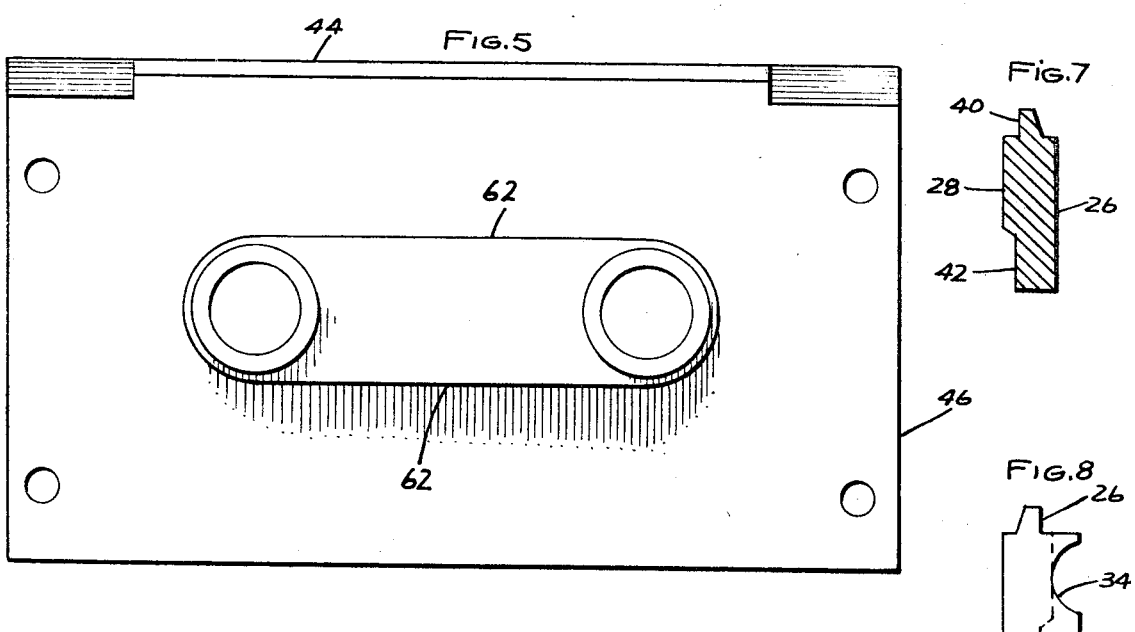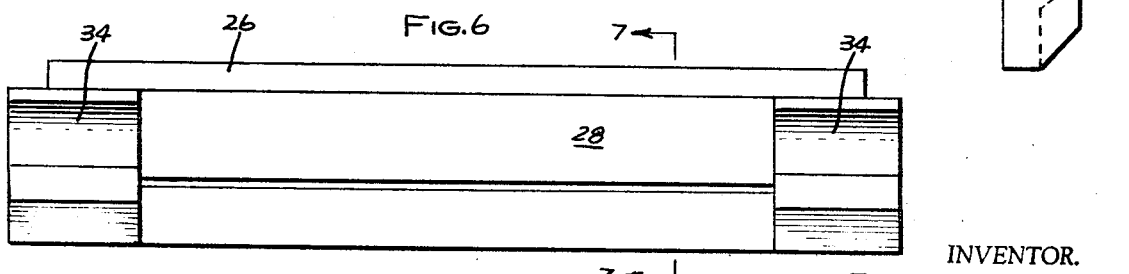

3,523,000
Patented Aug. 4, 1970

3,523,000
PUMP
Eldon S. Miller, Fort Wayne, Ind.
(6645 SW. 129 Terrace, Miami, Fla. 33156)
Filed Sept. 19, 1968, Ser. No. 760,869
Int. Cl. F04b 43/00, 43/08
U.S. Cl. 417—477
8 Claims

ABSTRACT OF THE DISCLOSURE

This invention relates to a pump comprising a housing having an opening in one side, a closure for the opening which is removably fitted to the housing, a straight length of flexible tubing, said closure having an inner surface engaged by a length section of the tubing, and said tubing being removably retained between portions of the housing and the closure. Means are contained within the housing for squeezing in one direction a localized portion of the tube section, this squeezing action moving progressively along the length of said section closing the localized portion against the inner surface of said closure. The closure and housing are locked against separation in the direction of the squeezing force by means of mating projection and recess portions in the closure and housing. The closure and housing further have abutting surfaces separable in the direction of the squeezing action and latching means for releasably locking the abutting surfaces together, thereby locking the closure onto the housing. The closure is removable for convenient access to the section of tubing, making it convenient to remove the latter from the housing and replacing it with a new or clean section.

BACKGROUND OF THE INVENTION

Field of the invention

The invention relates generally to pumps and more particularly to peristaltic pumps wherein a section of flexible tubing may be conveniently removed and replaced by another section.

Description of the prior art

In the processing of milk, it is necessary to pump the milk from location to location. Inasmuch as milk processed by dairies primarily is for human consumption, it is essential that all mechanisms used in connection therewith be maintained sanitary and more particularly be cleaned daily and sometimes oftener so as to prevent latent traces of milk from becoming soured and spoiled and becoming mixed with good milk. Such mechanisms must, therefore, be so constructed as to be susceptible of convenient and thorough cleaning in such a way that not a trace of milk will remain therein after a cleaning operation.

SUMMARY OF THE INVENTION

In accordance with the broader aspects of this invention, there is provided a pump especially adapted for handling milk in which the liquid-handling portions thereof may be conveniently and easily cleaned or replaced without any possibility of traces of milk remaining therein. Such pump includes a housing having an opening in one side and a closure for the opening which is removably fitted to the housing. A straight length of flexible tubing is engaged with a flat inner surface of the closure, the tubing being removably retained between portions of the housing and the closure. Means are contained within the housing for squeezing in one direction a localized portion of the tubing, this squeezing action occurring progressively and movably along the length of the tubing and against the flat inner surface of the closure. The closure is so arranged that it can be easily and quickly removed from the housing, thereby exposing the tubing for removal from the housing. The tubing may either be replaced by a sterilized section or the one that has been removed can be sterilized and reinstalled.

It is therefore an object of this invention to provide a peristaltic pump in which the flexible tubing may be quickly and easily removed and replaced.

It is another object of this invention to provide a peristaltic pump in which a closure for the pump housing is adapted removably to engage the flexible tubing in such a manner as to hold it in place during pump operation but quickly to release the tubing when it is necessary to remove and clean the same.

Other objects will become apparent as the description proceeds.

The above-mentioned and other features and objects of this invention and the manner of attaining them will become more apparent and the invention itself will be best understood by reference to the following description of an embodiment of the invention taken in conjunction with the accompanying drawings, wherein:

BRIEF DESCRIPTION OF THE DRAWINGS

FIG. 1 is a side elevation of one embodiment of this invention partially sectioned for clarity of illustration;

FIG. 2 is a cross-section taken substantially along section line 2—2 of FIG. 1;

FIG. 3 is a side elevation of the interior of one side portion of the housing;

FIG. 4 is a cross-section taken substantially along section line 4—4 of FIG. 3;

FIG. 5 is a side elevation of the other side portion of the housing;

FIG. 6 is a plan view of the underside of the closure used in conjunction with the housing;

FIG. 7 is a cross-section taken substantially along section line 7—7 of FIG. 6;

FIG. 8 is an end view of the closure of FIG. 6;

FIG. 9 is a perspective illustration of the pump mounted for operation;

FIG. 10 is a fragmentary sectional illustration taken substantially along section line 10—10 of FIG. 9 showing the latch construction; and FIG. 11 is a similar sectioned fragmentary view taken substantially along section line 11—11 of FIG. 10.

DESCRIPTION OF THE PREFERRED EMBODIMENT

Referring to the drawings, and more particularly to FIGS. 1 and 2, the working embodiment there illustrated includes a housing 12 having a cavity 14 therein which receives for rotation two sprockets 16 and 18 having a conventional chain 20 passed therearound. On the chain 20 is mounted a series of rollers 22 spaced apart as shown and extending outwardly from the chain 20. The upper side of the housing 12 is open in the region indicated by the numeral 24, a flat closure or cover plate 26 being removably fitted to the housing 12 for closing the opening 24. The inner surface 28 of the cover plate 26 is flat as more clearly shown in FIG. 2 and has positioned thereagainst a straight section of flexible tubing 30 of rubber, plastic or the like.

As shown more clearly in FIGS. 3, 4 and 6, opposite end portions of the housing are provided with part cylindrical recesses 32 in which nests opposite end portions of the tubing 30. The cover plate 28 (FIG. 6) has provided in its opposite ends similarly shaped cylindrical recesses 34 which are positioned opposite the housing recesses 32 so as to surround intimately the tubing 30 and retain it in position.

As shown in FIGS. 3 and 4, a straight, elongated recess 36 is provided in the upper portion of the housing part 38, and the cover plate 28 is provided with a tongue or projection 40 which complements the shape of the recess 36 and intimately fits therein as shown more clearly in FIG. 2. It will be noted that the projection 40 and recess 36 extend parallel to the length of tubing 30.

The cover plate 26 is also provided with a flat surface 42 which abuts against a companion flat surface 44 on the upper edge of the housing part 46, shown in detail in FIG. 5. The cover plate 26 is locked onto the housing by means of the latching mechanism shown in more detail in FIGS. 9, 10 and 11. In the cover 26 is provided a slot-like opening 48, and a cavity 50 is provided in the housing part 46 in alignment therewith. A crank-shaped lever 52 has an arm 54 fitted into the opening 48 and cavity 50, this lever 52 being pivotally connected to the cover plate 26 by means of a pin 56 fitted therein. Another pin 58 secured to the housing part 46 and extending across the cavity 50 is engaged by a cam portion 60 in the arm 54 of the lever such that when the lever 52 is positioned as shown by the solid line configuration in FIG. 11, the cover 26 will be clamped tightly onto the housing 12. When the lever 52 is swung to its dashed line position, the cam portion 60 is disengaged from the pin 58, thereby releasing the cover plate 26 from the housing. Thus released, the cover plate may be swung away from the housing 12 to the dashed line position 26a of FIG. 10.

In assembling and disassembling the pump, the cover 26 is first removed from the housing 12. If the tubing 30 is already present in the pump, it is removed. If desired, the usual cleaning procedures are followed, after which the tubing 30 is reinstalled in the housing 12, the opposite ends thereof being nested in the part-cylindrical recesses 34. The cover plate 26 is installed by first inserting the projection 40 into the recess 36 and then swinging the cover plate 26 downwardly until the abutting surfaces 42 and 44 engage. The lever 52 which at this time is in its open, dashed line position as shown in FIGS. 9, 10 and 11 is now swung downwardly to the full-line position, locking the cover firmly in place.

Upon rotation of the sprockets 16 and 18, the rollers 22 are progressively brought into engagement with the tubing, squeezing it closed in a localized area as shown in FIG. 2, forcing the liquid ahead of it as the chain moves. In the illustration of FIG. 1, it is assumed that the sprockets 16 and 18 are rotated clockwise and the rollers 22 are advanced toward the right.

Shoulders 61 and 62 are provided on the housing parts 38 and 46 as shown in FIGS. 3 and 5, for supporting the chain 20 which rides thereon. This is shown in FIG. 1. A shoulder or boss portion 61 may be formed integrally with the housing part 38 of FIG. 3 as may the shoulder or boss 62 on the part 46 of FIG. 5. Alternatively, these embossments 61 and 62 may be separate pieces secured in place by the shafts which support the sprockets 16 and 18.

As many of the locking mechanisms 52 may be used as needed in order to secure firmly the cover 26 in place FIG. 9 illustrates the use of two of these; however, additional ones may be used without departing from the spirit and scope of this invention.

While the pump of this invention has been described in connection with the handling of liquid such as milk, it will be understood that all viscous materials may be used.

While there have been described above the principles of this invention in connection with specific apparatus, it is to be clearly understood that this description is made only by way of example and not as a limitation to the scope of the invention.

What is claimed is:
1. A pump comprising a housing having an opening in one side, a closure for said opening removably fitted to said housing, a flexible tube, said closure having an inner surface engaged by a length section of said tube, said housing and said closure having cooperating portions, said tube being removably retained between said cooperating portions, means contained within said housing for squeezing in one direction a localized portion of said tube section movably and progressively along the length of said section closed against said inner surface, said closure and housing being locked against separation in the direction of said squeezing by mating projection and recess portions, the projection portion being in one of the closure and housing and the recess portion being in the other, said closure and housing further having abutting surfaces separable in the direction of said squeezing, and latching means for clamping said abutting surfaces together thereby releasably securing said closure onto said housing.

2. The pump of claim 1 in which the portions of said housing and closure which retain said tube are shaped to conform to the shape of said tube, said last-mentioned portions being spaced apart and disposed with said tube section therebetween, whereby removal of said closure from said housing permits access to said tube and removal thereof from said housing.

3. The pump of claim 2 in which said opening and said closure are elongated, said closure and opening having longitudinal edges engageable with each other, said projection and recess portions being in said edges, respectively, and extending transversely to said squeezing direction.

4. The pump of claim 3 in which said abutting surfaces are elongated and flat and lie in a plane transverse to said squeezing direction.

5. The pump of claim 4 in which said latching means is mounted adjacent to said abutting surface and including a manually operable lever pivotally secured to one of said closure and housing.

6. The pump of claim 5 in which said lever is mounted in aligned openings in said closure and housing, said lever being pivotally secured to said closure and having an arm extending into the aligned housing opening, a latch pin in the last-mentioned opening, said arm having a cam portion engageable with said pin for securing said closure in place on said housing.

7. The pump of claim 6 in which said recess portion is straight and elongated and is disposed in the edge of said opening, said projection portion being straight and elongated and being located on the edge of said closure.

8. The pump of claim 7 in which said squeezing means includes a chain passed around two rotatable sprockets mounted in said housing, a series of rollers mounted in spaced apart relation on said chain and engageable sequentially with said tube section as said sprockets are rotated, said chain having a straight portion extending parallel to the inner surface of said closure, said inner surface being flat and said tube section being straight.

References Cited

UNITED STATES PATENTS

| | | | |
|---|---|---|---|
| 249,285 | 11/1881 | Allen | 103—149 |
| 2,483,924 | 10/1949 | Moulinier | 103—149 |
| 3,011,684 | 12/1961 | Corneil | 103—149 |
| 3,259,268 | 7/1966 | Anderson | 220—55 |

HENRY F. RADUAZO, Primary Examiner